(12) United States Patent
Kanazawa

(10) Patent No.: US 7,519,545 B2
(45) Date of Patent: Apr. 14, 2009

(54) SYSTEM FOR SELLING COMMODITIES AND METHOD THEREOF

(75) Inventor: Masanobu Kanazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 515 days.

(21) Appl. No.: 09/812,845

(22) Filed: Mar. 21, 2001

(65) Prior Publication Data
US 2002/0035513 A1 Mar. 21, 2002

(30) Foreign Application Priority Data
Sep. 19, 2000 (JP) .............................. 2000-283949

(51) Int. Cl.
G06Q 30/00 (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| | | | | |
|---|---|---|---|---|
| 5,319,542 A * | 6/1994 | King et al. | ..................... | 705/27 |
| 6,131,085 A * | 10/2000 | Rossides | ........................ | 705/1 |
| 6,167,383 A | 12/2000 | Henson | | |
| 6,266,651 B1 * | 7/2001 | Woolston | ..................... | 705/27 |
| 6,330,543 B1 * | 12/2001 | Kepecs | ........................ | 705/14 |
| 6,415,263 B1 * | 7/2002 | Doss | ............................. | 705/26 |
| 2002/0010651 A1 * | 1/2002 | Cohn et al. | ..................... | 705/26 |

FOREIGN PATENT DOCUMENTS

| | | |
|---|---|---|
| JP | A-7-078289 | 3/1995 |
| JP | 10-055399 | 2/1998 |
| JP | 11-031184 | 2/1999 |
| JP | A-11-149451 | 6/1999 |
| JP | A-11-161713 | 6/1999 |
| JP | 2000-099577 | 4/2000 |

OTHER PUBLICATIONS

PR Newswire, "Acer America announces new reseller co-op program and channel promotions", Oct. 2, 1996, p. 1002sfw022.*
Lake, Matt, "A skeptic's guide to Web shopping", Home Office Computing, vol. 16, No. 3, p. 100, Mar. 1998.*

(Continued)

Primary Examiner—F. Zeender
Assistant Examiner—Christopher Buchanan
(74) Attorney, Agent, or Firm—Staas & Halsey LLP

(57) ABSTRACT

An employee of a company that has concluded a commodity-sales-to-employees contract with a seller accesses a sales system using a dedicated URL. A certification sub-system certifies the employee based upon employee information registered in an employee database. A commodity management sub-system displays a commodity catalog indicating an employee price on the terminal screen of the employee when the employee accesses the sales system using the dedicated URL, and displays a commodity catalog indicating an ordinary price on the terminal screen of a general end-user customer when the end-user customer accesses the sales system using an ordinary URL. An account settlement system sells the commodities designated by a customer at the price indicated in the commodity catalog.

20 Claims, 14 Drawing Sheets

OTHER PUBLICATIONS

European Office Action dated Oct. 6, 2006 for corresponding European Patent Application No. 01 302 715.6.

"Waves of e-revolution are attacking all industries!: Verification of Japanese dot-com power. Exploring a winning strategy using keywords such as e-marketplace, ASP, and i-mode.", pp. 96-97, Nikkei NetBusiness, No. 61, Nikkei Business Publications, Inc. (7 pages with 1 additional page of English language translation).

Notice of Rejection Ground issued Jan. 6, 2009 in Japanese Patent Application No. 2001-266144 (4 pages with 1 additional page of English language translation).

* cited by examiner

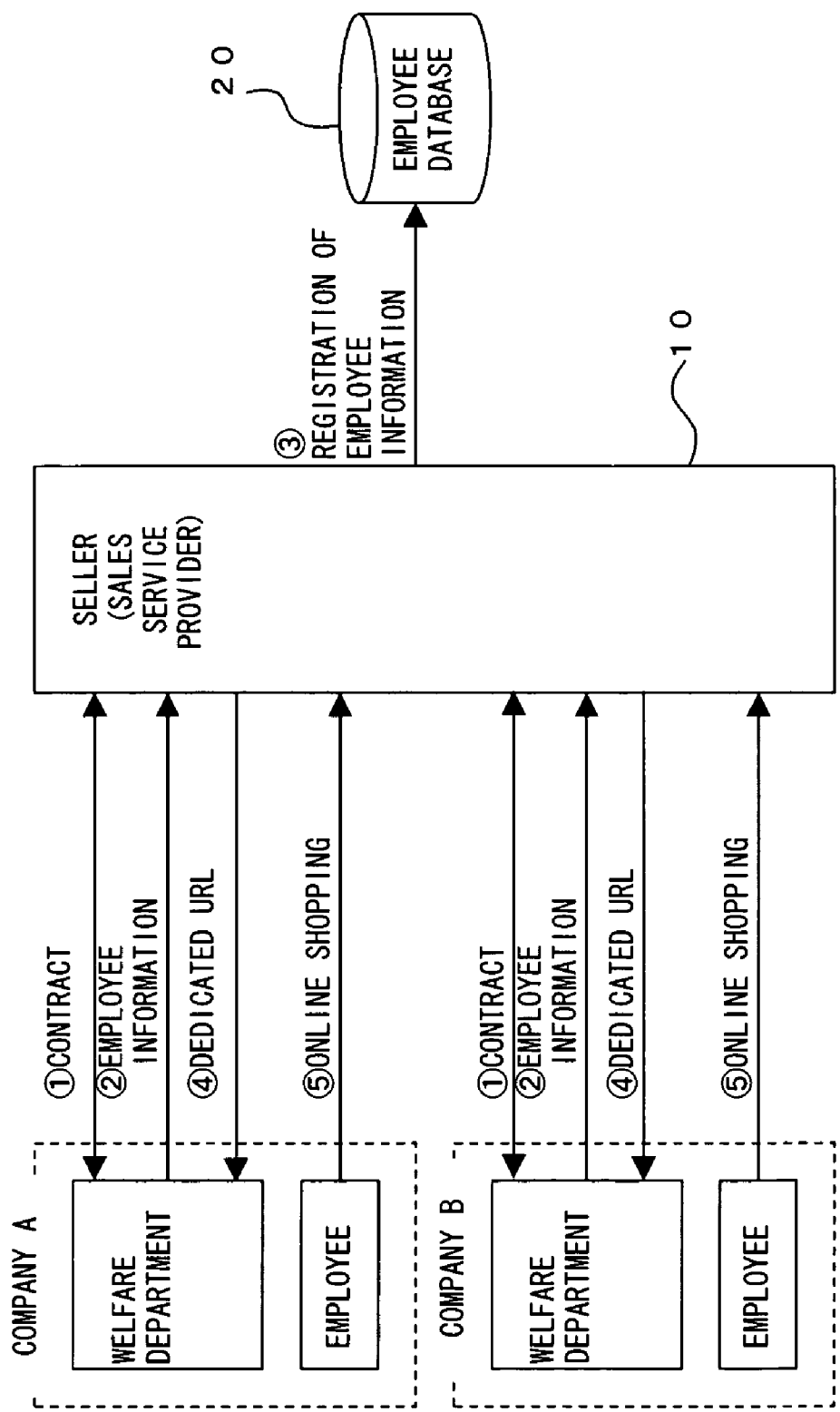

| COMMODITY | ORDINARY PRICE | EMPLOYEE PRICE |
|---|---|---|
| PERSONAL COMPUTER A | 254,800 | 229,320 |
| PERSONAL COMPUTER B | 229,800 | 206,820 |
| PERSONAL COMPUTER C | 85,800 | (NOT SET) |

F I G. 4 A

| COMMODITY | ORDINARY PRICE | EMPLOYEE PRICE FOR EMPLOYEES OF COMPANY A | EMPLOYEE PRICE FOR EMPLOYEES OF COMPANY B |
|---|---|---|---|
| PERSONAL COMPUTER A | 254,800 | 229,320 | 225,000 |
| PERSONAL COMPUTER B | 229,800 | 206,820 | (NOT SET) |
| PERSONAL COMPUTER C | 85,800 | (NOT SET) | 79,000 |

F I G. 4 B

| COMMODITY | PRE-INSTALLATION | CPU | MEMORY | HDD | DISPLAY | WEB PRICE | |
|---|---|---|---|---|---|---|---|
| PERSONAL COMPUTER A | APPLICATION a | a b c | 64MB | 30GB | 15 TYPE TFT | 254,800 | DETAILS/PURCHASE |
| PERSONAL COMPUTER B | APPLICATION b | a b c | 64MB | 30GB | 15 TYPE TFT | 229,800 | DETAILS/PURCHASE |
| PERSONAL COMPUTER C | APPLICATION c | x y z | 16MB | 2.4GB | 8 TYPE TFT | 85,800 | DETAILS/PURCHASE |
F I G. 5 A
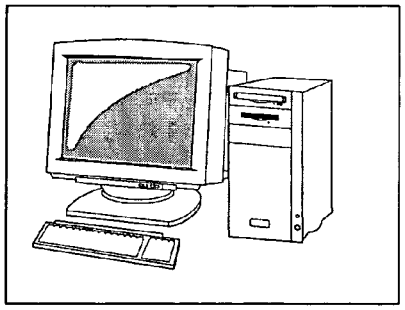
F I G. 5 B

| COMMODITY | PRE-INSTALLATION | CPU | MEMORY | HDD | DISPLAY | WEB PRICE | |
|---|---|---|---|---|---|---|---|
| PERSONAL COMPUTER A | APPLICATION a | a b c | 64MB | 30GB | 15 TYPE TFT | 229,320 FOR EMPLOYEE 254,800 | DETAILS/ PURCHASE |
| PERSONAL COMPUTER B | APPLICATION b | a b c | 64MB | 30GB | 15 TYPE TFT | 206,820 FOR EMPLOYEE 229,800 | DETAILS/ PURCHASE |
| PERSONAL COMPUTER C | APPLICATION c | x y z | 16MB | 2.4GB | 8 TYPE TFT | 85,800 | DETAILS/ PURCHASE |
F I G. 6 A
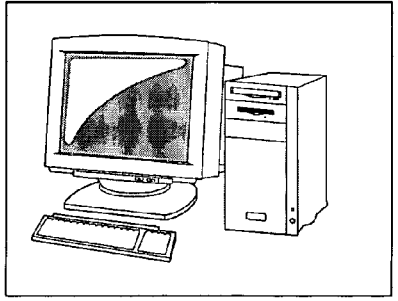
F I G. 6 B

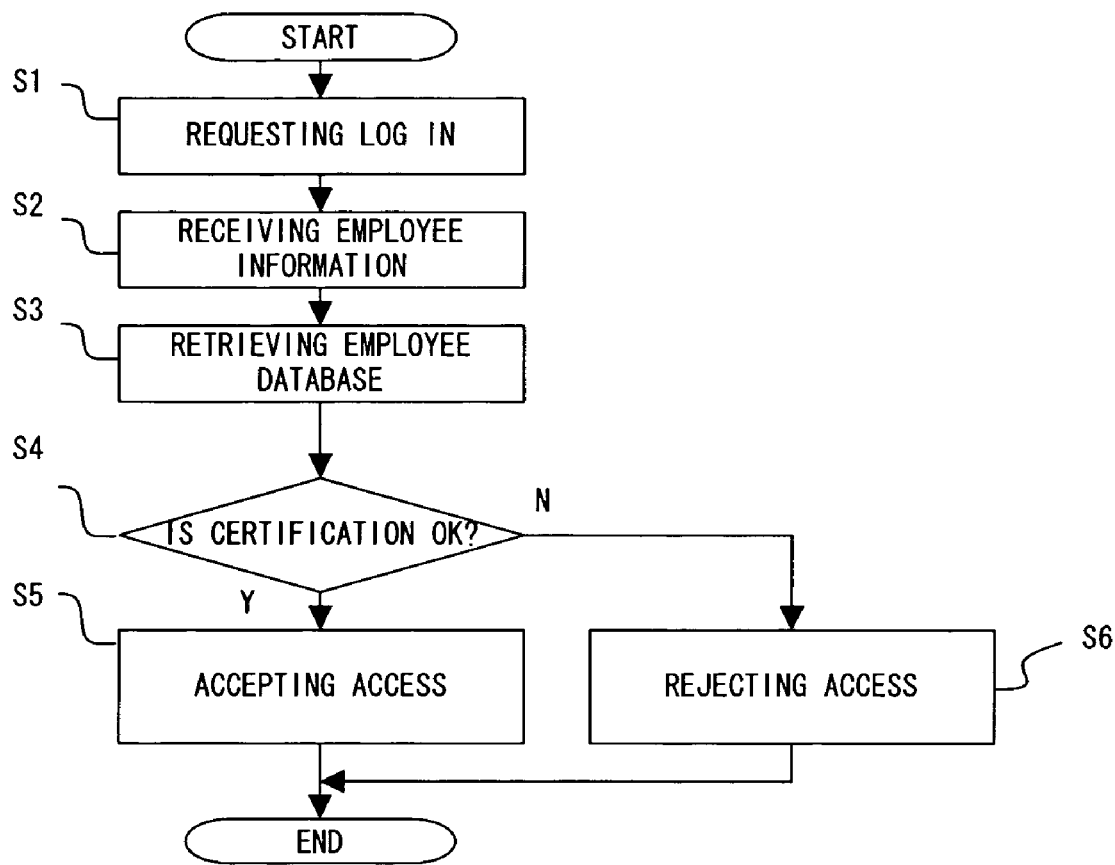
F I G. 9

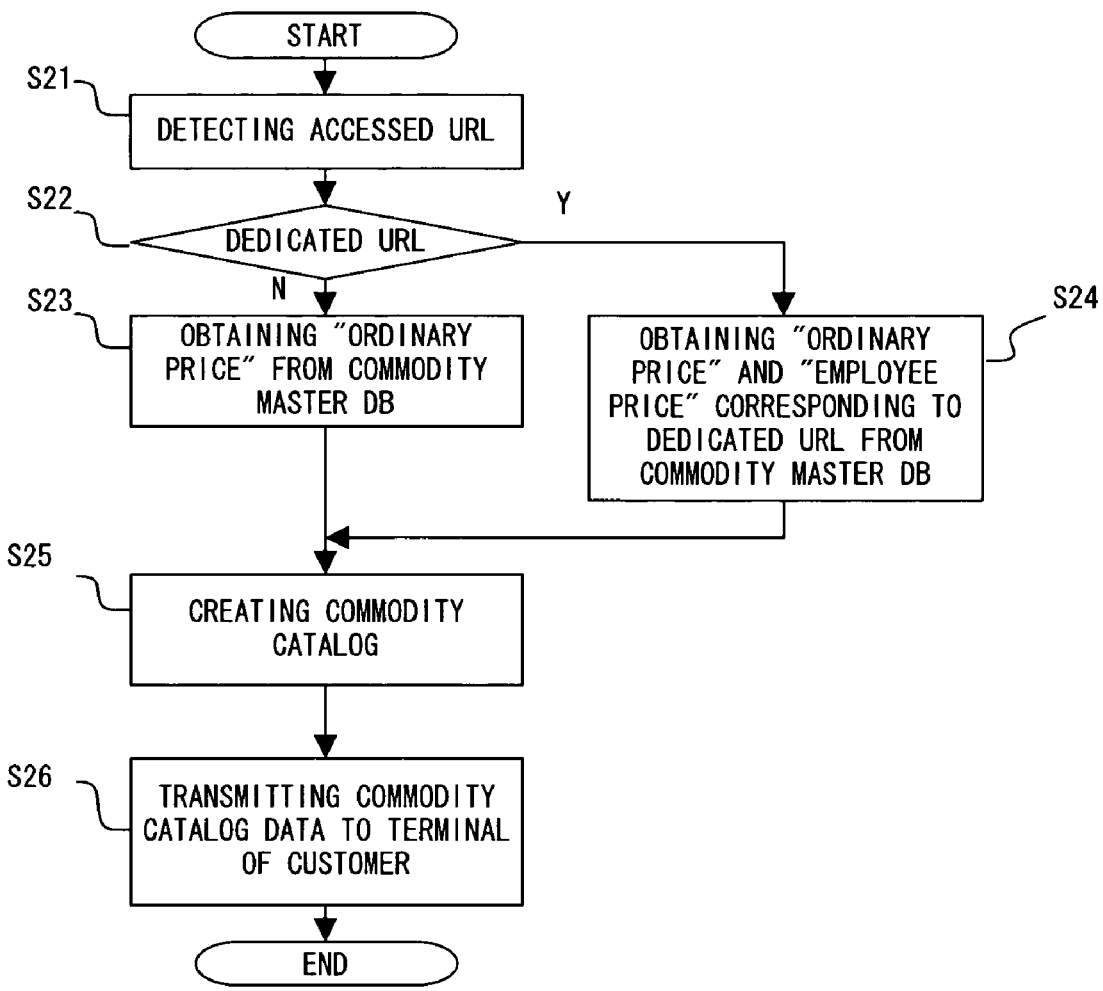
F I G. 1 1

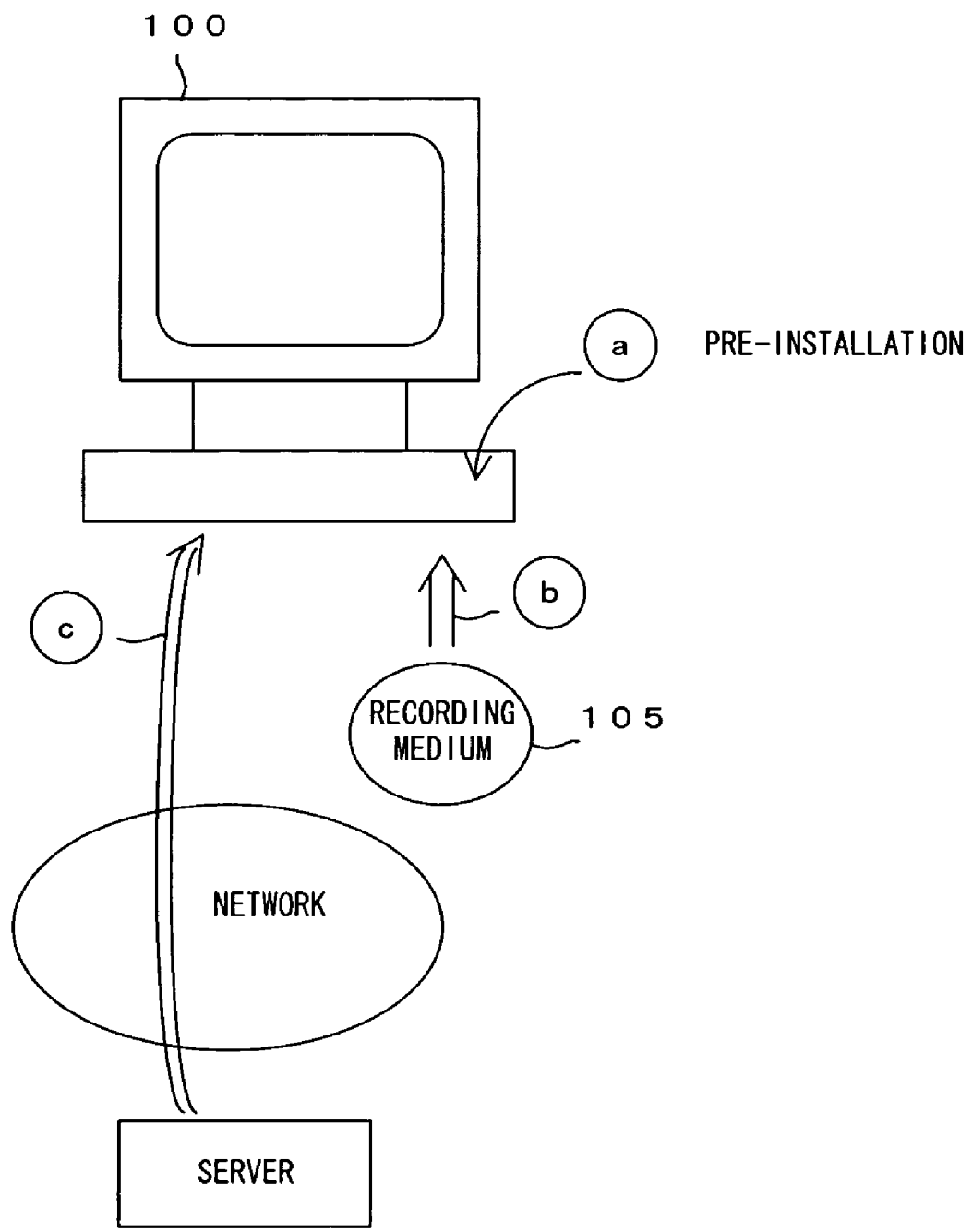
F I G. 14

SYSTEM FOR SELLING COMMODITIES AND METHOD THEREOF

BACKGROUND OF THE INVENTION

1. Field of the Invention

This invention relates to a method and system for selling commodities to constituent members of a group, particularly to employees of a company.

2. Description of the Related Art

Sales of commodities to employees have been executed as one of several welfare services for employees among a plurality of companies. Sales of commodities to employees represents the process of selling commodities to the employees of a company at a lower price than usual or it represents granting a certain special favor (awarding the recipient some benefits).

Commodity sales to employees are, for example, executed as follows. When a seller who sells commodities wants to sell commodities to employees of a company, firstly the seller has to enter into a contract with a personnel department or a welfare department of the company. Then, after concluding the contract with the department, the seller presents the catalogs of the commodities to the department. The welfare department distributes or circulates the commodity catalogs to the employees. When an employee of the company wants to purchase some of the commodities shown in the commodity catalog, the employee orders the commodities using an order sheet attached to the catalog. This order sheet is sent to the seller via the welfare department. When the seller receives the order sheet, the seller dispatches the ordered commodities to the purchaser. Payment for the ordered commodities is made, for example, in cash or through a deduction from the purchaser's salary.

The welfare department of the company that employs the employees intervenes between the seller and the employees in the commodity sales to employees, as mentioned above. In a big company that has a large number of employees, naturally the number of employees who make applications for such commodity sales is large, thus causing the department to require much labor and time to deal with the orders. For instance, the labor and time required to check a large number of orders (or applications) and the labor and time required to transfer the order sheets to the seller are great burdens to the welfare department.

In addition, the greater the burden on the welfare department, the more often the orders placed by employees remain outstanding at the department. So, such a case is likely to occur that a long time is required from the time of ordering of commodities to delivery of the commodities, or that the welfare department cannot firmly recognize how the orders are being handled. It also often bothers the employees who have placed an order for commodities how they have to settle their accounts for the ordered commodities. In addition, it is a matter of great importance to the company that if its employees peruse the catalogs and/or make an application to purchase commodities during the working hours, the labor productivity of the company may drop.

The above-mentioned problems can be solved by transforming the process of the commodity sales to employees into a process using electronic data. For instance, if the seller of the commodities makes an electronic catalog of the commodities and transfers it to the terminal of each employee, the burden on the welfare department is thought to become light. In addition, if E-commerce is introduced for the settlement of payments, that will also make the burden on the welfare department light.

It is true, however, that the scheme of commodity sales to employees is one of welfare services by the company for the employees, which is not a business directly producing a profit. Thus, virtually no budget is given for transforming the commodity sales to employees into an electronic system. The actual situation is, therefore, that transformation of the process of the commodity sales to employees into a process using electronic data has not been implemented in most companies.

This problem is not limited to the commodity sales to employees, but it also occurs to commodity sales to constituent members of various groups and organizations.

SUMMARY OF THE INVENTION

The purpose of the present invention is to enhance the efficiency of the commodity sales to constituent members of various groups or organizations. Another purpose of the present invention is to easily build a system to sell commodities to constituent members of various groups or organizations.

A method of the present invention is used in a system where commodity sales are made using a shopping site on a network. The method includes the following steps: judging whether a customer who has accessed via the network is a constituent member of a particular group; selling an ordered commodity based on first sales conditions if the customer is a constituent member of the particular group upon receiving the order for the commodity from the customer; and selling an ordered commodity based on second sales conditions if the customer is not a constituent member of the particular group upon receiving the order for the commodity from the customer.

In the method of the present invention, a constituent member who belongs to the particular group can purchase the commodity that he or she wants based on the first sales condition, when he or she accesses the shopping site. On the other hand, any other user can purchase the commodity that he or she wants based on the second sales condition, when he or she accesses the shopping site. That is to say, commodities are sold based on the first sales condition only to constituent members who belong to the particular group.

The selling price of the commodity based on the first sales condition is set lower than that of the second sales condition, thus enabling the seller to sell his or her commodities at a more favorable price to the constituent members of the particular group.

If the shopping site has a plurality of addresses and can be accessed at the plurality of addresses, the system can be configured in such a manner that whether the customer is a constituent member of the particular group is judged based on the address used by the customer for the access. In this case, it is easy to create a commodity catalog used to show sales conditions for individual customers.

Another method of the present invention is used in a system where commodity sales are made using a shopping site on a network. This method comprises the following sequence. A group to which a customer, who has accessed the shopping site via the network, belongs is identified. Then, the ordered commodity is sold to the customer based on a first sales condition if the customer is a constituent member of a first group among a plurality of particular groups; the ordered commodity is sold to the customer based on a second sales condition if the customer is a constituent member of a second group among the plurality of particular groups. In this method, it is possible to easily set the sales conditions, which differ depending upon each individual group, in selling commodities to each constituent member of the plurality of groups.

BRIEF DESCRIPTION OF THE DRAWINGS

FIG. 1 is a diagram showing the outline of a commodity sales system in an embodiment of the present invention.

FIG. 4A and FIG. 4B are examples of commodity master databases.

FIG. 5A and FIG. 5B are examples of commodity catalogs that are provided to general users.

FIG. 6A and FIG. 6B are examples of the commodity catalogs that are provided to the employees of a company which has concluded a commodity-sales-to-employees contract with the seller.

FIG. 9 is a flowchart showing the operation of the certification sub-system (Part 1).

FIG. 11 is a flowchart showing the operation of the commodity sales sub-system.

FIG. 14 shows the method of providing a software program related to the present invention.

DESCRIPTION OF THE PREFERRED EMBODIMENTS

Figure 2:
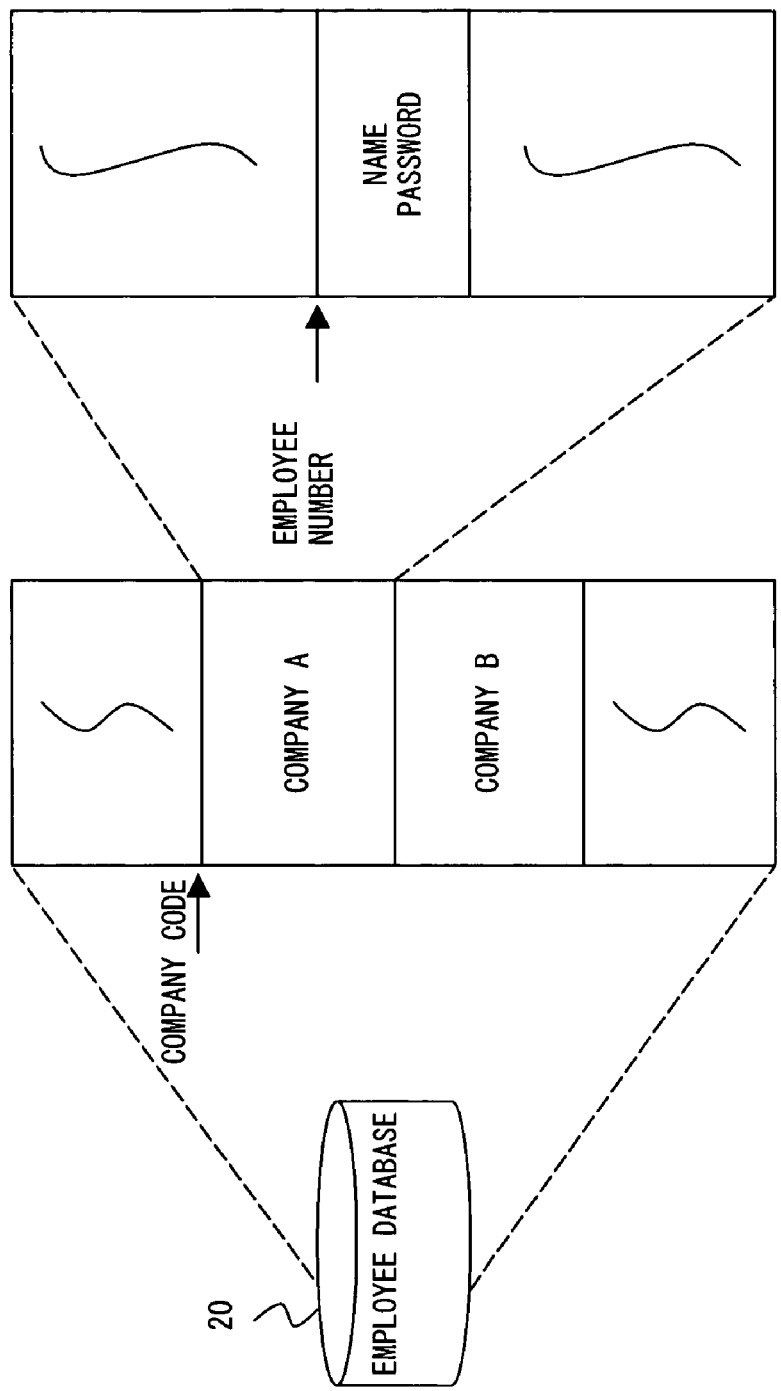
FIG. 2 is an example of the employee database.

Described below are embodiments of the present invention with reference to the drawings or diagrams. Please note that this invention relates to a method and system for selling commodities to constituent members of a particular group, however, a method and system for selling commodities to employees of one or a plurality of companies is shown as embodiments. Please also note that a "group" in this invention represents not only a company shown in the embodiment but various kinds of groups or organizations as well.

FIG. 1 is a diagram showing the outline of a commodity sales system of one embodiment of the present invention. In this embodiment, the seller 10 (the provider of the commodity-sales service) sells commodities at a special price (at a discounted-for-employee price) to employees of a company A and a company B.

The seller 10 is provided with a server device to sell various kinds of commodities using the network. Built into this server device is a homepage (Web page) that can be accessed via the internet, and a user who uses the internet can access this homepage and purchase commodities that the user wants to purchase. This homepage includes the function for providing the internet user with a commodity catalog as well as the function for receiving an order for commodities shown in the commodity catalog. Also, this homepage is created in such a way that it can be accessed by using a plurality of URLs (Uniform Resource Locator) which are different from one another. Please note that the seller 10 sells his or her commodities not only to employees of a particular contracted company, but also to general end-user customers.

The seller (the provider of the commodity-sales service) 10 is assumed to be a business entity independent from the company A and company B in this embodiment, but is not limited to it. For instance, the seller 10 can be one organization of the company A, and can sell commodities to general end-user customers as well as to the employees of the company A.

Furthermore, either of the following forms for selling commodities of the seller 10 can be adopted: the seller 10 which is one organization of the company A sells commodities to general end-user customers without special favor and to the employees of the company B with special favor; the seller 10 sells commodities to the employees of both of the company A and company B with special favor; and the seller 10 sells commodities to general end-user customers without special favor and to the employees of both of the company A and company B with special favor.

Also, if the seller (the provider of the commodity-sales service) 10 is one organization of the company A, the seller 10 does not have to conclude a commodity-sales-to-employees contract with the company A.

The company A and the company B each have their own welfare department, which is the department of the companies in charge of employee welfare. This department may be under the personnel department, depending upon the company, and may have another name. Please note that in this specification the "welfare department" is used as the department in charge of employee welfare including jobs related to the commodity sales to employees.

Described below, with reference to FIG. 1, is a basic sequence of the commodity sales to employees in the method of the embodiment.

(1) The seller 10 makes and enters into a commodity-sales-to-employee contract with the welfare department of each company. The prices and delivery times of the commodities sold to the employees of each company can be determined at the time the contract is negotiated between both parties. In this case, the price of each commodity can vary according to each individual company. In other words, when the same commodity is sold to the employees of the company A and to the employees of the company B, a different price can be set for the former and the latter. Please note, however, that the price of a plurality of the commodities sold to the employees of these companies (which is the price-for-employees) is generally lower than the price of those commodities sold to general end-user customers (which is the ordinary price).

(2) When this contract has been concluded, each company provides the seller 10 with information about their employees. The "employee information" is the information for identifying and certifying each employee, and it consists of, for example, the "name," "employee number" and "password" of each employee. The "employee number" is the identification number that each company assigns to each employee of the company. The "password" is set uniquely for an employee number. Also, the employee information is not limited to the above described example, but it is desirable to limit the employee information to the minimum amount of information necessary to certify each employee, when considering the security required to prevent the leakage of personal information. In addition, the employee information is transferred via a network from each company to the seller 10, but is not necessarily limited to this form of transfer.

(3) The seller 10 stores the employee information provided by each company in the employee database 20. An example of the employee database 20 is shown in FIG. 2. The employee information is stored, as per the company to which each employee belongs, using a company code as the key. The "company code" is an identification number that the seller 10 uniquely assigns to each company. The employee information about each employee is stored in the region of each company to which each employee belongs using the employee number as the key. In this embodiment, the "name" and "password" corresponding to the employee number are registered as the employee information.

(4) The seller 10 informs the company with which it has concluded the above-mentioned contract of a dedicated URL that is used for commodity sales to employees. This dedicated URL is the address that designates the shopping site managed by the seller 10. The seller 10 can inform each company of the same dedicated URL, or it can inform each company of different URLs. Then, the company which has been informed of the dedicated URL makes it possible for each employee to use the dedicated URL. At that time, the dedicated URL is set in the menu of an internal system that only the employees of that company can use. Or, each employee is notified of the dedicated URL by e-mail, etc.

(5) When purchasing commodities using the commodity-sales-to-employees scheme, an employee accesses the shopping site that is managed by the seller 10 using the dedicated URL. At that time the employee inputs the employee information (name, employee number and password). If information about this employee is registered in the employee database 20, the commodity catalog provided by the seller 10 is displayed on the terminal screen of that employee. This employee can purchase the commodities he wants to purchase from the commodity catalog displayed thereon.

Figure 3:
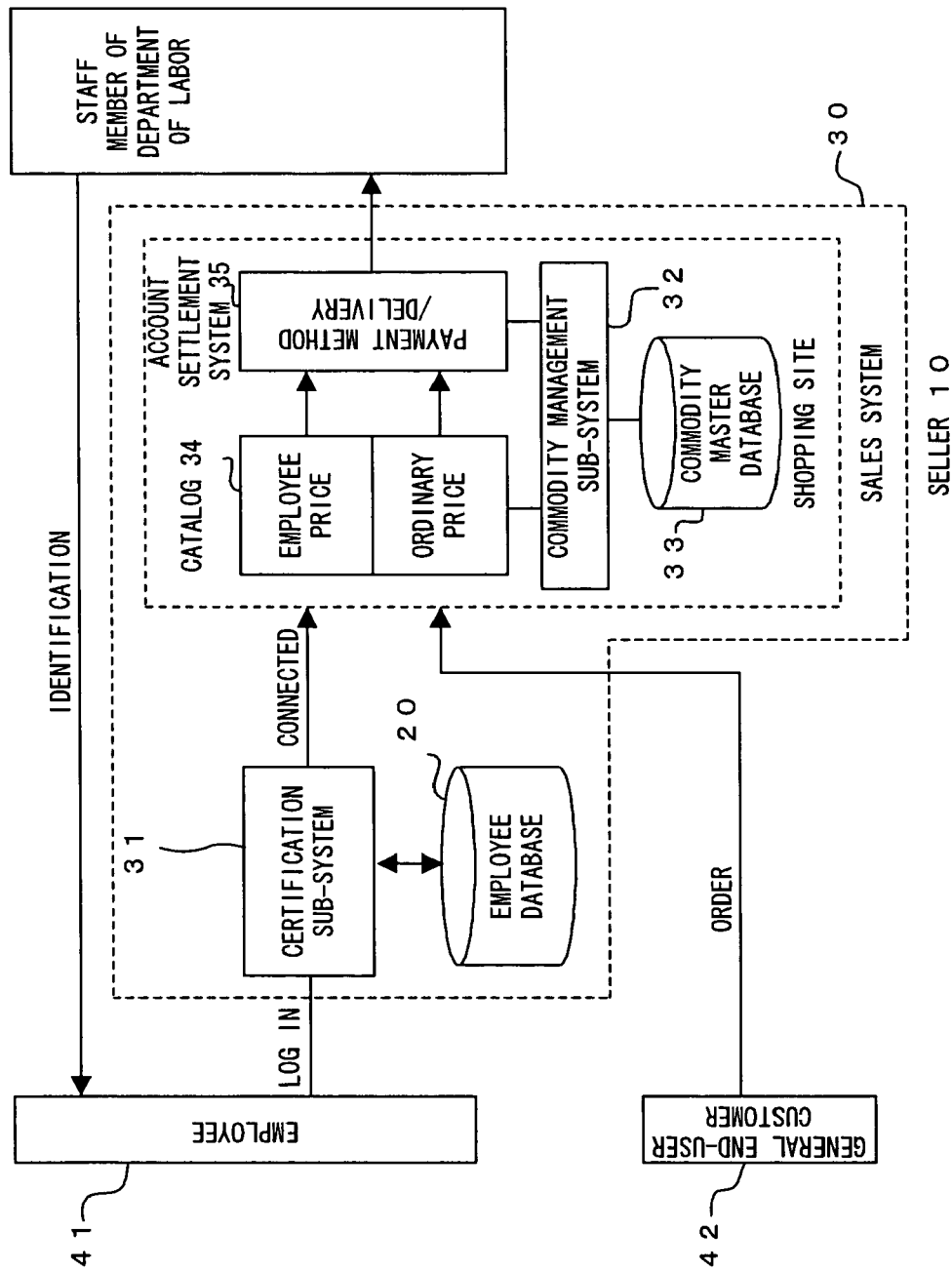
FIG. 3 is a block diagram showing an embodiment of a commodity sales system.

FIG. 3 is a block diagram showing an embodiment of a commodity sales system. The employee 41 is an employee of the company that has concluded a commodity-sales-to-employees contract with the seller 10. That is to say, the employee 41 has recognized the dedicated URL for commodity sales to employees. Also, it is presumed that the employee information about the employee 41 (name, employee number and password) has been registered in the employee database 20.

A sales system 30 is composed of a server computer managed by the seller 10. To be more specific, the server computer provides the following functions by executing a software program that has been made in advance. Please note that the sales system 30 consists of one computer or a plurality of computers. The computers can be connected with one another, for example, by a LAN (Local Area Network) or a WAN (Wide Area Network), when the sales system 30 consists of a plurality of computers.

A certification sub-system 31 receives access from an employee who uses the dedicated URL for commodity sales to employees and certifies the employee who has accessed it. In other words, access to the sales system 30 by using the dedicated URL is transferred to the certification sub-system 31. Upon receiving the access by using the dedicated URL, the certification sub-system 31 certifies the employee that has accessed it by referring to the employee database 20. Suppose that the employee 41 accesses the sales system 30 using the dedicated URL and inputs the employee information when accessing it. In this case, the certification sub-system 31 checks whether the employee information has been registered in the employee database 20. If the employee information has been registered in the employee database 20, the employee 41 is deemed to be a regular member for the commodity-sales-to-employees and is allowed to make this access. If the employee information has not been registered yet, this access is rejected and at the same time the commodity management sub-system 32 is notified as required.

The sales system 30 sells commodities not only to the employees of the contracted companies but also to arbitrary customers (general end-user customers 42). However, the general end-user customers 42 are not informed of the dedicated URL. Therefore, the general end-user customers 42 have to access the sales system 30 using the URL that is available to arbitrary customers (ordinary URL) in order to access the shopping site of the seller 10. At that time the certification sub-system 31 does not judge whether access that is made using the ordinary URL is accepted or rejected.

The commodity management sub-system 32 prepares the commodity catalog 34 upon receiving the access from a customer and displays it on the terminal screen of the customer who has accessed. Then, it receives an order from the customer and gives instructions to the account settlement system 35 based upon the order. To be more specific, the commodity management sub-system 32 has the following functions.

Upon receiving the access form the customer, the commodity management sub-system 32 checks whether the customer is a regular-member customer or a general end-user customer. In this judgement, for example, the URL that is designated by the customer is used. In other words, if the dedicated URL is designated, access is deemed to be from a regular-member customer, and if an ordinary URL is designated, access is deemed to be from a general end-user customer.

The commodity management sub-system 32 creates the commodity catalog 34 with reference to the commodity master database 33. Shown in FIG. 4A and FIG. 4B are examples of the commodity master database 33. FIG. 4A is an example of the commodity master database 33 that is used when the company A and the company B in FIG. 1 are informed of the same dedicated URL. Here, the "ordinary price" is the price offered to general end-user customers, and the "employee price" is the price offered to the employees of the company A and the company B. The "employee price" is basically lower than the "ordinary price". However, commodities for which the "employee price" is not set are sold to the regular-member customers at the "ordinary price."

FIG. 4B is an example of the commodity master database 33 that is used when the company A and the company B in FIG. 1 are informed of a different URL. In this case, a different price is set for the company A and the company B. For instance, a personal computer A is sold to the employees of the company A at the price of 229,320 yen, but it is sold to the employees of the company B at the price of 225,000 yen.

In the example of the commodity master database 33, only the selling price of each commodity is registered, as shown in FIG. 4A and FIG. 4B. In reality, however, various pieces of information concerning the commodities are registered. For example, images, specifications and delivery times of the commodities are stored in the commodity master database 33.

FIG. 5A and FIG. 5B show examples of the commodity catalog 34 provided to general end-user customers. FIG. 5A is an example of a list of commodities, which is edited by the commodity management sub-system 32, displayed on the terminal screen of a general end-user customer. This commodities list is created by extracting the information concerning the commodities that are retrieved by the end-user customer from the commodity master database 33. In this example, "personal computer" is input as the key word by the customer. And in this commodity list, "ordinary price" that is registered in the commodity master database 33 is set in place of the "WEB price."

FIG. 5B is an example of the commodity order display window that is displayed on the terminal screen of the end-user customer. This window is displayed, for example, by clicking on the "details/purchase" button for a particular commodity in the commodity list shown in FIG. 5A. When the end-user customer wants to purchase the commodity displayed on his or her terminal screen, he has to designate the "quantity" and click on the "purchase: yes"button. In this case, the seller 10 sells the commodity to the customer at the price displayed as the "WEB price."

FIGS. 6A and 6B are examples of the commodity catalog that is provided to the employees of the company which has concluded a commodity-sales-to-employees contract with the seller 10. FIG. 6A is an example of a commodity list, which is edited by the commodity management sub-system 32, displayed on the terminal screen of the employee. In this commodity list, the "ordinary price" and the "employee price" are set in place of the "WEB price." The "ordinary price" and the "employee price" are extracted from the commodity master database 33. When a different employee price is set according to individual companies that have concluded a commodity-sales-to-employees contract with the seller 10, as shown in FIG. 4B, the "employee price" set for the company to which the employee who has accessed belongs is used.

FIG. 6B is an example of the commodity order display window that is displayed on the terminal screen of the employee. In this window, the "ordinary price" and the "employee price" are displayed in place of the "WEB price". When the employee places an order for some commodities using this window, the seller 10 sells the commodities at the price displayed as the "employee price." In the example shown in FIG. 6B, therefore, the seller 10 sells the personal computer A not for 254,800 yen, but for 229,320 yen.

When a customer (the employee 41 or the general end-user customer 42) purchases a commodity by selecting it from the commodity catalog displayed on the terminal screen of the customer, the customer has to designate the commodities he or she wants to purchase and input the payment method and the address to which the commodity is to be sent, using the terminal screen of the customer. When the customer places an order for commodities, he or she has to follow the procedures requested by the sales system 30. In other words, the sales system 30 displays a window wherein required information is inputted, on the customer's terminal screen, and the customer inputs the required information in accordance with the instructions appearing on the window. An example of the ordering method has already been described above with reference to FIG. 5B and FIG. 6B.

Upon receiving an order for commodities from a customer, the sales system 30 checks whether the order has been received either from a general end-user customer or from an employee of the company that has concluded a commodity-sales-to-employees contract with the seller 10. If the order has been received from an employee of the company that has concluded a commodity-sales-to-employees contract with the seller 10, the sales system 30 confirms whether it is a true order or a false order. In the example shown in FIG. 3, when the sales system 30 receives an order from the employee 41, the staff member of the seller 10 telephones the employee 41 and confirms "whether the employee 41 has really ordered or not". This process is done to avoid accepting false orders. If an illegal user has stolen the employee information about the employee 41 and acquired the dedicated URL, the illegal user can purchase any commodity at the "employee price" by accessing the sales system 30 using the employee information and URL. Therefore, this confirmation work is performed to avoid such a situation. This confirmation work can also be performed by means other than by telephone.

Upon receiving the order from a customer, the account settlement system 35 settles the payment at the price that has been offered to the customer. That is to say, when the sales system 30 receives an order from an employee 41, the system 35 requests the employee 41 for the settlement of payment at the price that has been offered to the employee 41. When the sales system 30 receives an order from an end-user customer 42, the system 35 requests the end-user customer 42 for the settlement of payment at the "ordinary price" that has been offered to the customer 42. The payment method is designated by each customer. Each customer can select, for instance, a bank transfer or a credit card as the payment method. In the scheme of commodity sales to regular-member employees, the method of deducting the payment amount from their salary can be used.

A payment method used in general online shopping can be used as the payment method for this scheme. That is, the account settlement system 35 can be realized by way of an existing technology. However, if the account settlement for an employee is executed by the method of deduction from his or her salary, the program for performing this function must be added. Then, the ordered commodities are dispatched according to the description of the order. In the scheme of commodity sales to the regular-member employees, it is possible to deliver the ordered commodities from the seller 10 to the company to which the employee who has ordered the commodities belong.

In the system of this example, only the constituent members of a particular group are informed of the dedicated URL. When such a constituent member accesses the sales system 30 using the dedicated URL, the price lower than the one offered to end-user customers is displayed on the terminal screen of the constituent member. Therefore, the constituent members of the group can purchase commodities at a price lower than that for end-user customers. Here, the sales system 30 has the function for certifying constituent members of the particular group. Therefore, even the constituent member of the particular group cannot purchase the commodities at the "employee price" when he or she accesses the sales system 30 using the dedicated URL, if the certification function rejects the access.

The sequence in which the sales system 30 provides the commodity sales service, basically, does not depend upon the company that uses the service. The processing sequence of the sales system 30 is basically the same, when, for example, it provides the commodity sales service to the employees of the company A or when it provides the commodity sales service to the employees of the company B. Therefore, if the seller 10 has once configured the sales system 30, the seller 10 can easily provide the commodity sales service to a plurality of companies, thus causing resources to be effectively used.

The system that realizes the commodity sales to employees can be configured based upon a system used to sell commodities to general end-user customers. To be more specific, the sales system of this example can be realized by adding to the system used to sell commodities to general end-user customers, the function for certifying the employees of a particular company, the function for offering the "employee price" to the certified employees and the function for selling commodities at the price offered. Therefore, the seller who has already performed an online shopping can begin implementing the commodity sales to employees service.

Figure 7:
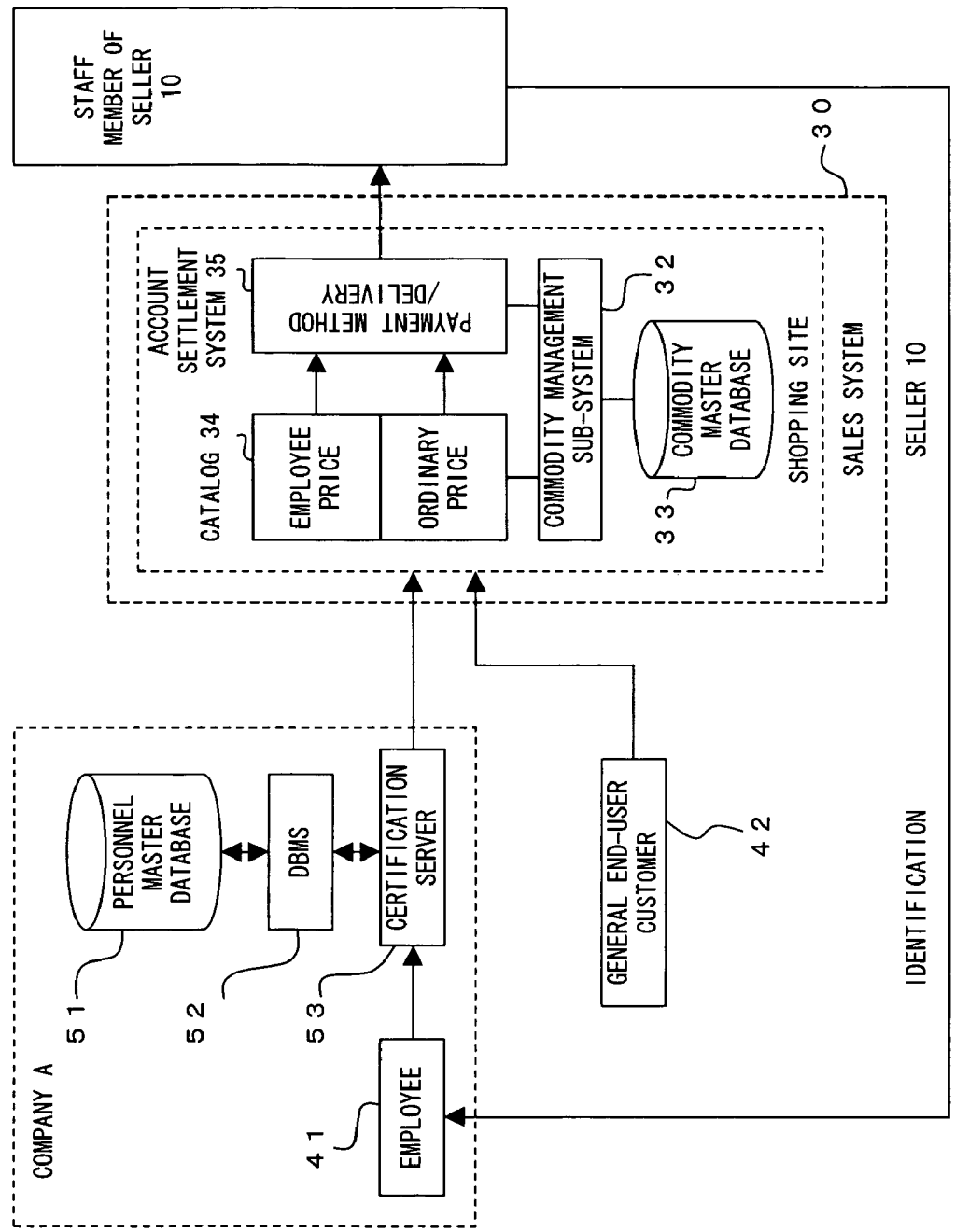
FIG. 7 is a block diagram showing another embodiment of the commodity sales system.

FIG. 7 is a block diagram showing another embodiment of a commodity sales system. In the configuration shown in FIG. 3, the function for certifying the employees who use the commodity sales to employees service is provided in the sales system 30. In this embodiment, however, the function for certifying the employees is provided in each company. Described below is this embodiment based on the supposition that the employee 41 is an employee who belongs to the company A.

The personnel master database 51 is a database managed by the personnel department of the company A and it stores personal information of each employee who belongs to the company A. Registered in the database as the personal information are, for instance, the name, employee number, password, department to which employee belongs, birthday, address, telephone number, etc. The personnel database is updated from time to time according to employee movement such as hiring, leaving and personnel reshuffle. The database management system (DBMS) 52 provides an interface for accessing the personnel master database 51.

The certification server 53 certifies the employees of the company A with reference to the personnel master database 51. In this embodiment, the employee of the company A, when logging in to the internal system (including the intranet), must be certified by the certification server 53. That is, the employee 41 can use the internal system of the company A only after he or she is certified by the certification server 53. This certification is executed by checking whether employee information such as the name, employee number, password, etc. are registered in the personnel master database 51.

In the above-mentioned configuration, the dedicated URL of which the company A is informed of by the seller 10 is set, for instance, in the menu for employees that is provided by the internal system of the company A. That is, the employee 41, when purchasing commodities using the commodity sales to employees service, can access the sales system 30 by selecting the dedicated URL from the menu for employees that is provided by the internal system. This internal system can be used only by the employees who are certified by the certification server 53. In other words, only the employees who are certified by the certification server 53 can access the sales system 30 using the dedicated URL.

Next, described below is the sequence that is used in this embodiment when the employee 41 purchases commodities from the seller 10. First, the employee 41 logs into the internal system. At that time, the customer inputs the name, employee number, password, etc. The certification server 53, when receiving the request for logging-in, retrieves the personnel master database 51 using the information inputted by the employee 41 as the key, and it checks whether the employee 41 is a regular member of the company that has concluded a commodity-sales-to-employees contract. When the certification server 53 succeeds in certifying the employee, it allows the employee 41 to access the internal system.

The employee 41 selects "sales to employee" from the menu provided by the internal system. Then, the employee can access the sales system 30 using the dedicated URL, and the commodity catalog 34 provided by the sales system 30 is displayed on the terminal screen of the employee. The sales system 30, when being accessed by the employee using the dedicated URL, prepares the commodity catalog 34 that offers the "employee price." The method for preparing the commodity catalog has been described above with reference to FIG. 3, FIG. 4A, FIG. 4B, FIG. 6A and FIG. 6B. Please note that the procedure in which the employee 41 places an order for commodities and the procedure to be taken after that are the same as those for the embodiment shown in FIG. 3.

In the embodiment shown in FIG. 7, the seller 10 does not have to manage the employees of the company A, so there is the following merit. In the event of employee movement such as at hiring or leaving the company, the company A must inform the seller 10 about such employee movement, in the embodiment shown in FIG. 3. Whenever the seller 10 receives the information, the seller 10 must update the employee database 20. That is, in this case, the burden is borne by both the company A and the seller 10.

However, these operations are not required in the embodiment shown in FIG. 7. Of course, employee movement such as at hiring or leaving the company is updated each time such movement takes place, but the updating operation occurs regardless of whether the commodity sales to employees service is implemented. That is, in the company A, no special operation is created in implementing the commodity sales to employees service. In addition, the seller 10 does not need to manage the employee information of the company A, so that the system configuration can be simple.

Figure 8:
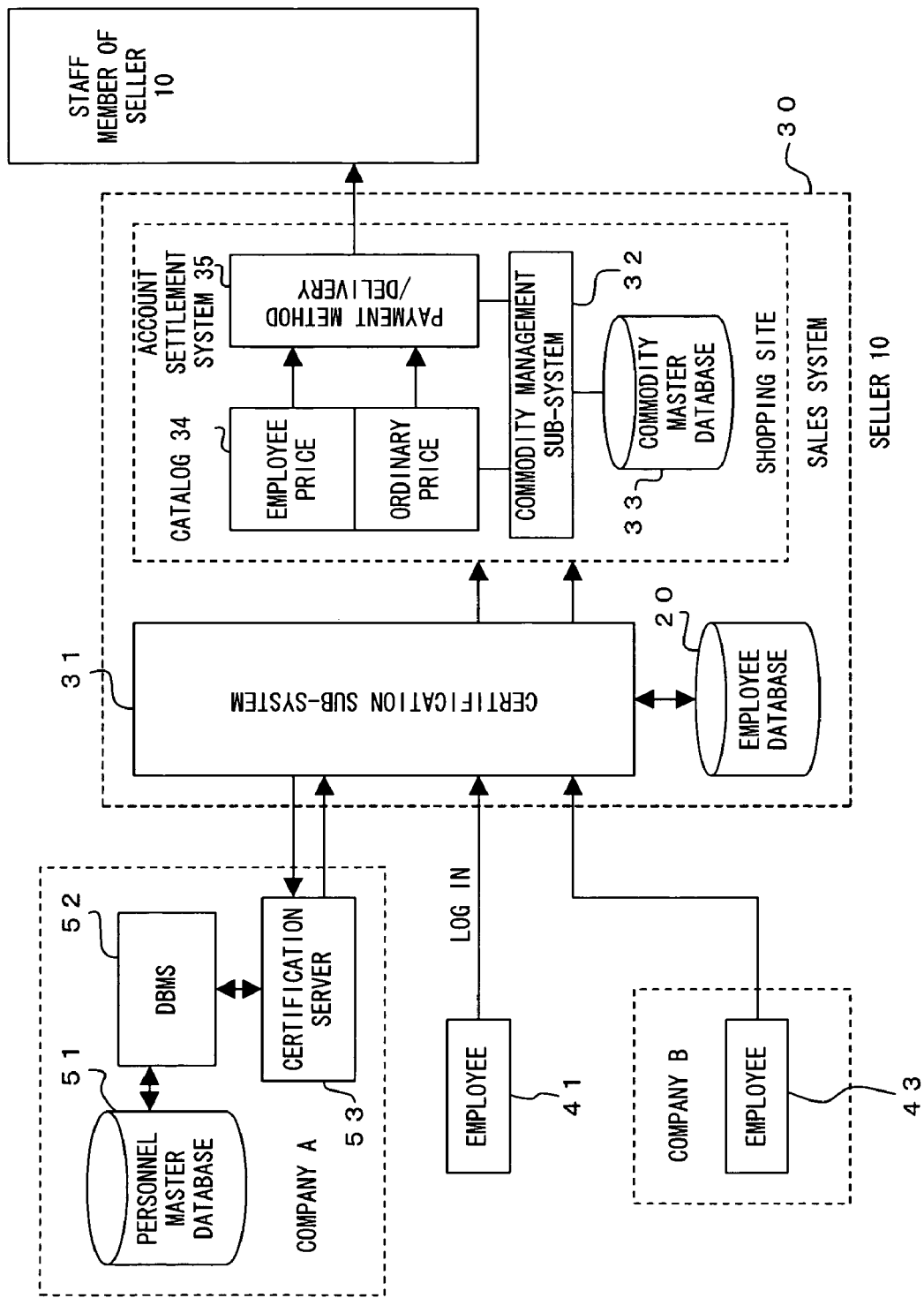
FIG. 8 is a block diagram showing another additional embodiment of the commodity sales system.

FIG. 8 is a block diagram showing another embodiment of a commodity sales system. In this embodiment, it is assumed that the company A is provided with a personnel master database system, but the company B is not provided with it. Consequently, the employee database 20 of the sales system 30 does not stores the employee information of the company A, but the employee information of the company B.

When the employee 41 of the company A accesses the sales system 30 using the dedicated URL, the certification subsystem 31 requests the certification server 53 to certify the employee 41. The certification server 53 certifies the employee 41 with reference to the personnel master database 51, and sends the results back to the certification sub-system 31. Then, when the employee 41 is certified, the certification sub-system 31 allows the employee 41 to access it and connects the terminal of the employee 41 to the commodity management sub-system 32. The procedures to be taken after that are the same as those shown in FIG. 3 and FIG. 7, so explanations are omitted.

On the other hand, when the employee 43 of the company B accesses the sales system 30 using the dedicated URL, the certification sub-system 31 tries to certify the employee 43 with reference to the employee database 20. Then, if the employee 43 is certified, the certification sub-system 31 allows the employee 43 to access it and connects the terminal of the employee 43 and the commodity management subsystem 32. The subsequent procedures to be taken are the same as those shown in FIG. 3 and FIG. 7, so explanations are omitted.

FIG. 9 is a flowchart showing the operation of the certification sub-system 31 in the embodiment shown in FIG. 3. This process is executed when the sales system 30 is accessed using the dedicated URL.

In Step S1, the request by a customer to log in is detected. At that time a window for inputting employee information (name, employee number, password) is displayed on the terminal screen of the customer. In Step S2, employee information inputted by the customer is received. In Steps S3 and S4, the employee database 20 is retrieved using the employee information received in Step S2, and whether that customer has been registered is checked. If that customer has been registered, that customer is allowed to access the sales system 30 in Step S5. That is, the terminal of that customer is connected to the commodity management sub-system 32. If that customer has not been registered, that customer's access is rejected in Step S6.

The operation of the certification server 53 in the embodiment shown in FIG. 7 basically follows this flowchart. Please note that the certification server 53 starts the certification operation upon access of the internal system by an employee.

Figure 10:
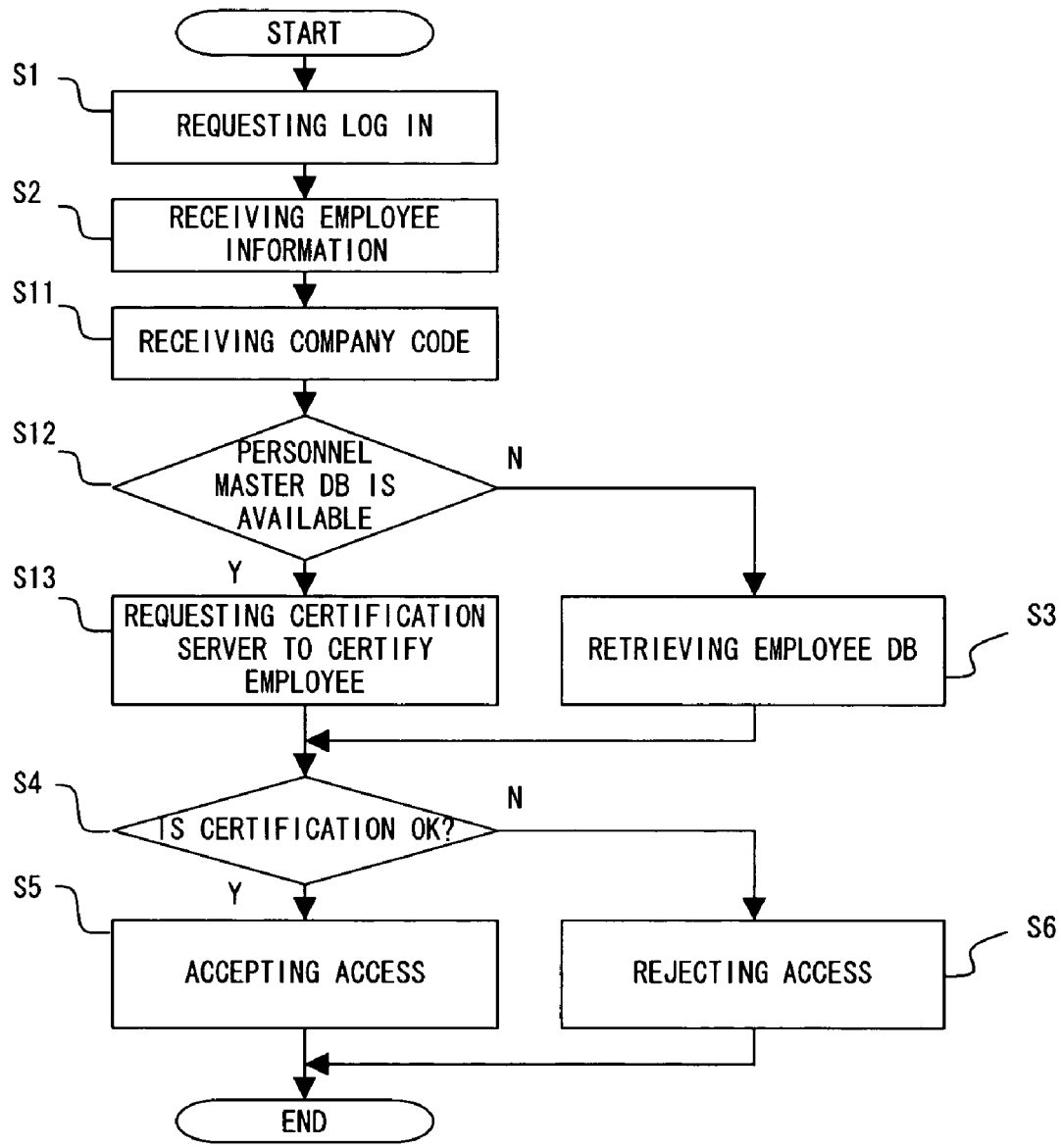
FIG. 10 is a flowchart showing the operation of the certification sub-system (Part 2).

FIG. 10 is a flowchart showing the operation of the certification sub-system 31 in the embodiment shown in FIG. 8. This flowchart is obtained by adding the step for requesting the certification server 53 to certify the employee to the flowchart shown in FIG. 9. Therefore, the same step number is attached to the same processes in FIG. 9 and FIG. 10. In the processing sequence in this flowchart, the employee must input the employee information and input the "company code" to identify the company to which the employee belongs.

The company code inputted by the employee is received in Step S11. Then, it is judged in Step S12 whether the personnel master database of the company to which the employee belongs is available to certify the employee based upon the company code received. Please note that whether the personnel master database of each company is available has been determined in advance. When the personnel master database of the company to which the employee belongs is available to certify the employee, the certification sub-system 31 requests the certification server 53 of that company to certify the employee in Step S13. At that time, the certification server 53 basically executes the processes of the flowchart shown in FIG. 9, and informs the certification sub-system 31 of the results. On the other hand, when the personnel master database of that company is not available, the step S3 is executed. Steps S4 to S6 have already been explained with reference to FIG. 9.

When a different dedicated URL is assigned to each company, each employee does not have to input the company code. That is, the certification sub-system 31 identifies the company to which each employee belongs based upon the dedicated URL designated to the company, and the judgement in Step S12 is made according to the identification results.

In the system of the embodiment shown in FIG. 3 to FIG. 8, when a customer accesses the sales system 30 using the dedicated URL for the commodity sales to employees service, the customer who has accessed the sales system 30 is certified by the certification sub-system 31 or the certification server 53 (in some cases, by a combination of the certification sub-system 31 and the certification server 53). Therefore, even if an illegal customer accesses the sales system 30 using the dedicated URL, that access is rejected. That is, only the employees of the company that has concluded a commodity-sales-to-employees contract with the seller 10 can access the sales system 30 using the dedicated URL.

FIG. 11 is a flowchart showing the operation of the commodity management sub-system 32. This process is executed when the sales system 30 is accessed using the dedicated URL or the ordinary URL. Please note that the access by using the dedicated URL is permitted by the certification process shown in FIG. 9 or FIG. 10.

A URL that has been accessed is detected in Step S21 and Step S22. If a URL other than a dedicated URL has been accessed, in other words, if an ordinary URL has been accessed, the "ordinary price" is obtained from the commodity master database 33 in Step S23. However, if a dedicated URL has been accessed, the "ordinary price" and the "employee price" are obtained from the commodity master database 33 in Step S24. At that time, when a different URL is assigned to each company, the "employee price" corresponding to the URL that has been accessed is obtained, as already explained with reference to FIG. 4B.

A commodity catalog is created in Step S25. To be more specific, the commodity catalog 34 is created, for instance, by incorporating the data representing the price obtained in Steps S23 or S24 in the catalog data that have been prepared in advance. Here, the catalog data includes such information as an image of each commodity, specifications of each commodity and buttons as the user interface. Then, the commodity catalog data to display the commodity catalog 34 created in Step S25 is transmitted to the terminal unit of a customer.

Then, the commodity catalog 34 is displayed on the terminal screen of the customer. At that time, on the terminal screen of the customer who has accessed the sales system 30 using the dedicated URL, the commodity catalog representing the "ordinary price" and the "employee price" is displayed, as shown in FIGS. 6A and 6B. If the customer orders commodities using this display window, the seller 10 sells the commodities to the customer at the "employee price". On the terminal screen of the customer who has accessed the sales system 30 using the ordinary URL, the commodity catalog 34 representing only the "ordinary price" is displayed, as shown in FIGS. 5A and 5B. If the customer orders commodities using this display window, the seller 10 sells the commodities to the customer at the "ordinary price."

In the embodiment that has been explained with reference to FIG. 1 through FIG. 11, the dedicated URL is assigned to the company that has concluded a commodity-sales-to-employees contract with the seller 10, but the present invention is not limited to the embodiment. That is, the present invention includes, for example, the method for judging whether the commodity sales to employee's service is to be implemented on the basis of the access route to the sales system 30.

Figure 12:
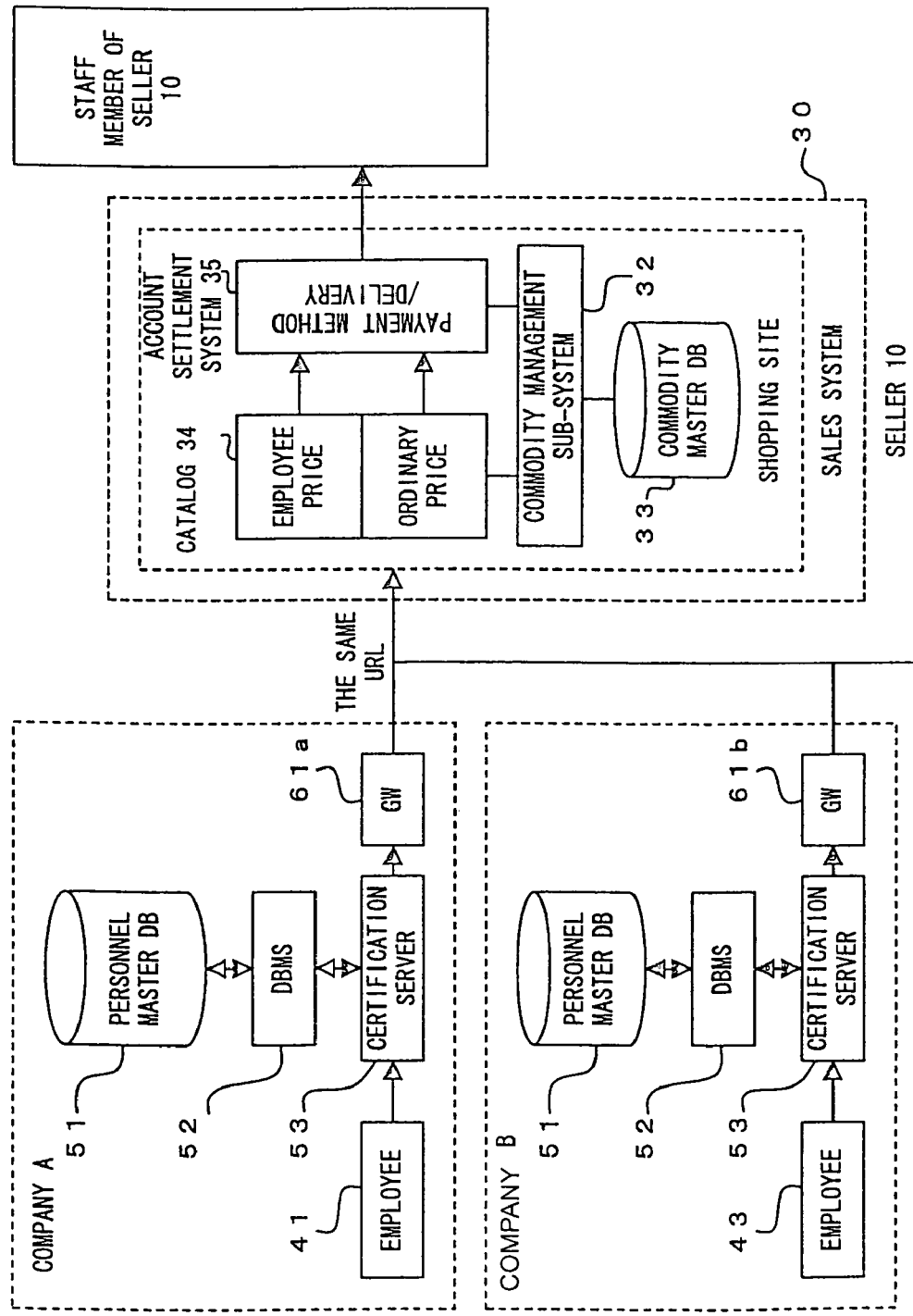
FIG. 12 is a block diagram showing another embodiment of the commodity sales system.

FIG. 12 is a block diagram showing another embodiment of the commodity sales system. In this embodiment, the dedicated URL is not used for the commodity-sales-to-employees service, and all customers, including general end-user customers, access the sales system 30 using the same URL.

When the sales system 30 is accessed, the commodity management sub-system 32 detects the route of access. If the commodity management sub-system 32 detects access via the gateway 61a, it obtains the "employee price" for the employees of the company A from the commodity master database 33, and offers the obtained "employee price" to the employee using the commodity catalog 34. If the commodity management sub-system 32 detects the access via the gateway 61b, it offers the "employee price" for the employee of the company B to the employee. Please note that such information that determines the gateway of the company that has concluded a commodity-sales-to-employees contract with the seller 10 should have been registered in the commodity management sub-system 32 at the time of concluding the contract, and that these contracted companies are provided with the functions for certifying the employees of these companies (such as personnel master database 51, certification server 53).

When the commodity management sub-system 32 detects access not via the gateway registered in the sales system 30, it obtains the "ordinary price" from the commodity master database 33 and offers the price to the customer using the commodity catalog 34. In this embodiment, therefore, the selling price is determined based upon access route to the sales system 30.

In the above embodiments, the ordinary price is offered to general end-user customers and the employee price is offered to the employees of a particular company, but the present invention is not limited to this. For example, the ordinary price is offered to general end-user customers and a discount rate for the ordinary price may be offered to the employees of a particular company. Or, the ordinary price is offered to general end-user customers and the amount to be refunded in cash may be offered to the employees of a particular company. In other words, the present invention includes a price structure wherein certain fixed sales conditions are offered to general end-user customers and sales conditions more favorable than those offered to general end-user customers are offered to the employees of a particular company.

The function of the commodity sales system is obtained by executing the program (program code) that describes processes of the flowcharts using a computer. Shown in FIG. 13 is a block diagram of the computer 100 that executes the program.

A CPU 101 loads the program that describes the processes shown in the flowcharts, from the storage device 102 to the memory 103, and executes the program. The storage device 102 is, for instance, a hard disk, which stores the program. The memory 103 is, for instance, a semiconductor memory, which is used as the operation region of the CPU 101. Here, the employee database 20 and the commodity master database 33 are stored, for instance, in the storage device 102 or the memory 103.

A recording medium driver 104 accesses the portable recording medium 105 according to the instructions of the CPU 101. The portable recording medium 105 includes, for example, a semiconductor device (PC card, etc.), the medium in which information is inputted and outputted by a magnetic function (floppy disk, magnetic tape, etc.) and the medium in which information is inputted and outputted by an optical function (optical disk, etc.) A communication control unit 106 transmits and receives data to and from the network according to the instructions of the CPU 101.

Figure 13:
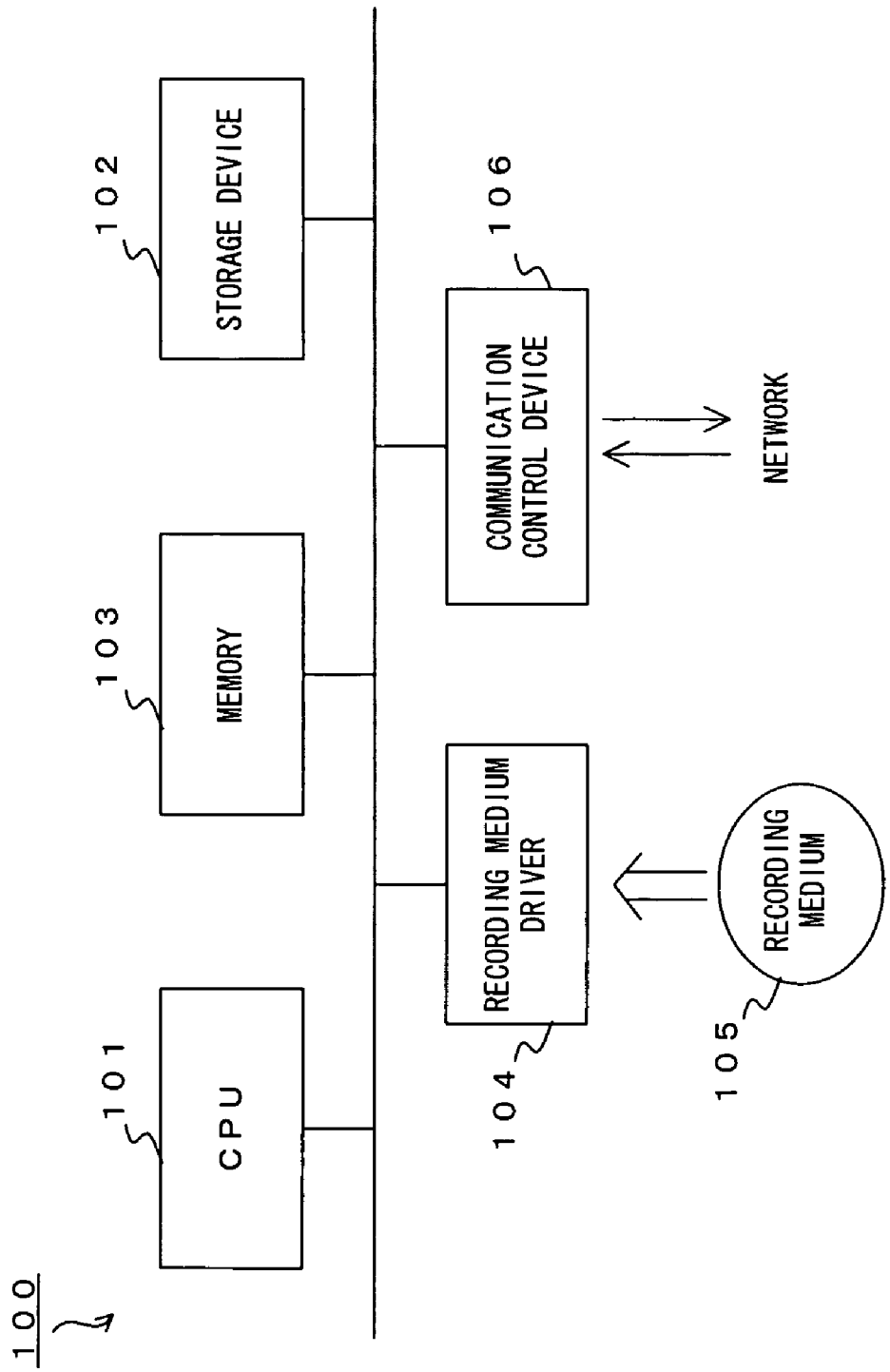
FIG. 13 is a block diagram of a computer that executes the program for realizing the present invention.

The terminal unit of each customer (employee 41, employee 43 or general end-user customer 42) is basically configured as shown in FIG. 13. The software for browsing the shopping site that is provided by the sales system 30 (for example, general browser software) is installed in the storage device 102 or the memory 103 of the terminal unit of each customer. The terminal device of each customer is equipped with an inputting device and a display screen. The inputting device is a keyboard, a mouse, etc., for inputting the instructions of the customer. The display screen can display various kinds of data received via the network.

FIG. 14 is a drawing explaining the method for providing a software program, etc. related to the present invention. The program for the present invention is provided, for instance, by any of the following tree methods.

(a) The program is provided after it is installed in the computer 100. In this case, the program, etc. is installed, for instance, in the storage device 102 before the commodity sales system is delivered.

(b) The program is provided after it is stored in the portable recording medium. In this case, the program, etc. stored in the portable recording medium 105 is installed in the storage device 102 via the recording medium driver 104.

(c) The program is provided from the server on the network. In this case, the computer 100 downloads the program, etc. stored in the server in order to obtain the program, etc.

In this embodiment, the computer that composes the sales system 30 and the terminal unit of each customer are connected by the internet, but the present invention is not limited to this configuration. That is, it is sufficient if the sales system 30 and the terminal unit of each customer are connected by any kind of communication network. The communication network can be a public network or a private network. The transmission medium of this communication network can be a cable transmission medium (such as an optical cable or a metal cable) or a wireless transmission medium.

By using the present invention it is possible to realize commodity sales to employees using online shopping, so that the burden (particularly, clerical work) on the company that implements the commodity sales to employees can be greatly reduced. In addition, if a company has the facilities for connecting the commodity sales system to a general communication network, it can execute commodity sales to employees using the facilities without introducing a special system for transforming the commodity-sales-to-employees service into electronic data.

Also, the seller can provide a plurality of companies with the commodity-sales-to-employees service, enabling the seller to enhance the efficiency of management.

What is claimed is:

1. A method for selling a commodity using a shopping site on a network, said method comprising:

providing, by a commodity selling system, a first network address for a constituent member of a particular group and a second network address for a customer who is not a member of the particular group, said first network address being a first Uniform Resource Locator for the constituent member of the particular group to enter the commodity selling system and said second network address being a second Uniform Resource Locator for the customer who is not a member of the particular group to enter the commodity selling system;

judging whether a customer who has accessed a commodity selling system via the network is a constituent member of a particular group based on a network address of a shopping site accessed by the customer;

judging whether certification is to be performed based on the network address of the shopping site accessed by the customer;

certifying the customer by referring to a database storing constituent member information of the particular group, when the customer is judged to be a constituent member of the particular group;

selling an ordered commodity based on first sales conditions if the customer is certified as a constituent member of the particular group, upon receiving the order for the commodity from the customer to the first network address; and selling an ordered commodity based on second sales conditions if the customer is not a constituent member of the particular group, upon receiving the order for the commodity from the customer to the second network address;

wherein both a first price as the first sales conditions and a second price as the second sales conditions are provided for the constituent member of the particular group through a first page identified by the first Uniform Resource Locator, the first price being lower than the second price, and the second price as the second sales conditions is provided for the customer who is not a constituent member of the particular group through a second page identified by the second Uniform Resource Locator.

2. The method according to claim 1, further comprising:

offering a first commodity catalog including the first sales conditions to the customer, if the customer is a constituent member of the particular group;

offering a second commodity catalog including the second sales conditions to the customer, if the customer is not a constituent member of the particular group; and selling the ordered commodity based on the first sales conditions upon receiving an order issued using the first commodity catalog, and selling the ordered commodity based on the second sales conditions upon receiving an order issued using the second commodity catalog.

3. A method for selling a commodity using a shopping site on a network, said method comprising:

judging whether a customer who has accessed a commodity selling system via the network is a constituent member of a particular group based upon a network route used by the customer to access the commodity selling system;

judging whether certification is to be performed based on the network route used by the customer to access the commodity selling system;

certifying the customer by referring to a database storing constituent member information of the particular group, when the customer is judged to be a constituent member of the particular group;

selling an ordered commodity based on first sales conditions if the customer is certified as a constituent member of the particular group, upon receiving an order for the commodity from the customer; and selling an ordered commodity based on second sales conditions if the customer is not a constituent member of the particular group, upon receiving an order for the commodity from the customer, wherein said first sales condition based on a first network route used by the constituent member of the particular group to enter the commodity selling system and said second sales condition is based on a second network route used by the customer who is not a member of the particular group to enter the commodity selling system, and wherein both a first price as the first sales conditions and a second price as the second sales conditions are provided for the constituent member of the particular group through a first page identified by the first network route, the first price being lower than the second price, and the second price as the second sales conditions is provided for the customer who is not a constituent member of the particular group through a second page identified by the second network route.

4. A method of selling a commodity using a shopping site on a network, said method comprising:

providing, by a commodity selling system, a dedicated network address for a constituent member of a particular group and a general network address for a customer other than a constituent member, said dedicated network address being a first Uniform Resource Locator for the constituent member of the particular group to enter the commodity selling system and said general network address being a second Uniform Resource Locator for a customer who is not a member of the particular group to enter the commodity selling system, judging whether certification of the customer is to be performed based on a network address of the commodity selling system accessed by the customer;

certifying a constituent member of the particular group by referring to a database storing constituent member information of the particular group, displaying a first commodity catalog including special sales conditions set for the constituent member of a particular group, on a terminal of the constituent member, when the constituent member accesses the shopping site using the dedicated network address;

displaying a second commodity catalog including ordinary sales conditions on a terminal of a customer other than the constituent member, when the customer access the shopping site using the general network address; and selling the ordered commodity based on the special sales conditions upon receiving the order issued using the first commodity catalog, and selling the ordered commodity based on the ordinary sales conditions upon receiving the order issued using the second commodity catalog;

wherein both a first price as the first sales conditions and a second price as the second sales conditions are provided for the constituent member of the particular group through a first page identified by the first Uniform Resource Locator, the first price being lower than the second price, and the second price as the second sales conditions is provided for the customer who is not a constituent member of the particular group through a second page identified by the second Uniform Resource Locator.

5. A method for selling a commodity using a shopping site on a network, said method comprising:

providing, by a commodity selling system, a first network address for a constituent member of a first group and a second network address for a constituent member of a second group, said first network address being a first Uniform Resource Locator for the constituent member of the particular group to enter the commodity selling system and said second network address being a second Uniform Resource Locator for a customer who is not a member of the particular group to enter the commodity selling system;

judging to which group among a plurality of particular groups a customer who has accessed via the network belongs based on a network address of a shopping site accessed by the customer;

judging whether certification is to be performed based on the network address of the shopping site accessed by the customer;

certifying the customer by referring to a database storing constituent member information of the particular group, when the customer is judged to be a member of the particular group;

selling an ordered commodity based on first sales conditions if the customer is certified as a constituent member of the first group, upon receiving an order for the commodity from the customer to the first network address; and selling an ordered commodity based on second sales conditions if the customer is a constituent member of the second group, upon receiving the order for the commodity from the customer to the second network address;

wherein both a first price as the first sales conditions and a second price as the second sales conditions are provided for the constituent member of the particular group through a first page identified by the first Uniform Resource Locator, the first price being lower than the second price, and the second price as the second sales conditions is provided for the customer who is not a constituent member of the particular group through a second page identified by the second Uniform Resource Locator.

6. The method according to claim 5, further comprising:

offering a first commodity catalog including the first sales conditions to the customer, if the customer is a constituent member of the first group;

offering a second commodity catalog including the second sales conditions to the customer, if the customer is a constituent member of the second group; and selling the ordered commodity based on the first sales conditions upon receiving an order issued using the first commodity catalog, and selling the ordered commodity based on the second sales conditions upon receiving an order issued using the second commodity catalog.

7. A system for selling a commodity, said system comprising:

a certification information storage unit storing information for certifying a constituent member of a particular group;

a certification unit certifying a customer is a constituent member of the particular group based upon reference to said certification information storage unit and a network address used by the customer when the customer accesses via a network a shopping site;

a commodity information storage unit storing first sales conditions that define conditions for selling commodity to a constituent member of the particular group and storing second sales conditions that define conditions for selling a commodity to a customer other than a constituent member of the particular group, said first sales condition being based on a network address represented by a first Uniform Resource Locator for the constituent member of the particular group to enter the commodity selling system and said second sales condition being based on a network address represented by a second Uniform Resource Locator for the customer other than the constituent member of the particular group to enter the commodity selling system; and a selling unit selling a commodity based on a result of said certification unit and the sales conditions stored in said commodity information storage unit, upon receiving an order for the commodity from the customer, wherein a plurality of network addresses for access by a plurality of customers are provided;

wherein both a first price as the first sales conditions and a second price as the second sales conditions are provided for the constituent member of the particular group through a first page identified by the first Uniform Resource Locator, the first price being lower than the second price, and the second price as the second sales conditions is provided for the customer who is not a constituent member of the particular group through a second page identified by the second Uniform Resource Locator.

8. The system according to claim 7, further comprising an offering unit offering the first sales conditions to the customer who has been certified by said certification unit and offering the second sales conditions to other customers, wherein
said selling unit sells the commodity to the customer based on the sales conditions offered to the customer when receiving an order for the commodity from the customer.

9. The system according to claim 7, wherein said commodity information storage unit stores the first and second conditions for each commodity.

10. The system according to claim 7, wherein said certification information storage unit and said certification unit are owned or managed by a seller who sells the commodities.

11. The system according to claim 7, wherein said certification information storage unit and said certification unit are owned or managed by the particular group.

12. The system according to claim 8, wherein said offering unit displays a commodity catalog including the first sales conditions on the terminal screen of the customer who has been certified by said certification unit, and displays a commodity catalog including the second sales conditions on the terminal screen of a customer other than the certified customer.

13. An apparatus for selling a commodity, said apparatus comprising:
a providing unit providing a shopping site that can be accessed via a first network address for a constituent member of a particular group and via a second network address for a customer other than a member of the particular group, said first network address being a first Uniform Resource Locator for the constituent member of the particular group to enter the commodity selling system and said second network address being a second Uniform Resource Locator for a customer who is not a member of the particular group to enter the commodity selling system, wherein the providing unit
determines whether the customer is a constituent member of the particular group based on a network address of the shopping site accessed by the customer,
judges whether certification is to be performed based on the network address of the shopping site accessed by the customer,
certifies the customer by referring to a database storing constituent member information of the particular group, when the customer is judged to be a constituent member of the particular group, and a commodity information storage unit storing first sales conditions that define conditions for selling a commodity to a constituent member of the particular group and storing second sales conditions that define conditions for selling a commodity to a customer other than a constituent member of the particular group; and a selling unit selling an ordered commodity based on the first sales conditions if the customer is certified as a constituent member of the particular group upon receiving the order for the commodity from the customer to the first network address, and selling an ordered commodity based on the second sales conditions if the customer is not a constituent member of the particular group upon receiving an order for the commodity from the customer to the second network address, wherein both a first price as the first sales conditions and a second price as the second sales conditions are provided for the constituent member of the particular group through a first page identified by the first Uniform Resource Locator, the first price being lower than the second price, and the second price as the second sales conditions is provided for the customer who is not a constituent member of the particular group through a second page identified by the second Uniform Resource Locator.

14. An apparatus for selling a commodity, said apparatus comprising;
a providing unit providing a shopping site that can be accessed via a first network address for a constituent member of a particular group and via a second network address for a customer other than a constituent member, said first network address being a first Uniform Resource Locator for the constituent member of the particular group to enter the commodity selling system and said second network address being a second Uniform Resource Locator for the customer other than the constituent member of the particular group to enter the commodity selling system, wherein the providing unit
judges whether certification is to be performed based on the network address of the shopping site accessed by the customer;
certifies the customer by referring to a database storing constituent member information of the particular group, when the customer is judged to be a constituent member of the particular group; and a selling unit selling an ordered commodity based on first sales conditions when accessed by a constituent member of the particular group using a first network address among the plurality of network addresses upon receiving an order for the commodity from the customer to the first network address and selling an ordered commodity based on second sales conditions when accessed by using a second network address upon receiving an order for the commodity from the customer to the second network address, wherein whether the customer is a constituent member of the particular group is determined based on a network address of a shopping site accessed by the customer;

wherein both a first price as the first sales conditions and a second price as the second sales conditions are provided for the constituent member of the particular group through a first page identified by the first Uniform Resource Locator, the first price being lower than the second price, and the second price as the second sales conditions is provided for the customer who is not a constituent member of the particular group through a second page identified by the second Uniform Resource Locator.

15. An apparatus for selling a commodity, said apparatus comprising:
   a providing unit providing a shopping site that can be accessed via a first network address for a constituent member of a first particular group and via a second network address for a constituent member of a second particular group, said first network address being a first Uniform Resource Locator for the constituent member of the particular group to enter the commodity selling system and said second network address being a second Uniform Resource Locator for the customer who is not a member of the particular group to enter the commodity selling system;
   a commodity information storage unit storing first sales conditions that define conditions for selling a commodity to a constituent member of the first particular group and storing second sales conditions that define conditions for selling a commodity to a constituent member of the second particular group; and
   a selling unit selling an ordered commodity based on the first sales conditions if the customer is a constituent member of the first particular group upon receiving an order for the commodity from the customer to the first network address and selling an ordered commodity based on the second sales conditions if the customer is a constituent member of the second particular group upon receiving an order for the commodity from the customer to the second network address,
   wherein the providing unit
      determines whether the customer is a constituent member of the particular group based on a network address of a shopping site accessed by the customer;
      judges whether certification is to be performed based on the network address of the shopping site accessed by the customer;
      certifies the customer by referring to a database storing constituent member information of the particular group, when the customer is judged to be a constituent member of the particular group, and
   wherein both a first price as the first sales conditions and a second price as the second sales conditions are provided for the constituent member of the particular group through a first page identified by the first Uniform Resource Locator, the first price being lower than the second price, and the second price as the second sales conditions is provided for the customer who is not a constituent member of the particular group through a second page identified by the second Uniform Resource Locator.

16. The system according to claim 7, further comprising a terminal device used for purchasing a commodity from a shopping site on a network, the terminal device comprising:
   an accessing unit accessing the shopping site, which offers a first commodity catalog to a constituent member of a particular group, and a second commodity catalog to a customer other than a constituent member of the particular group, using a predetermined address,
      wherein a first network address is a first Uniform Resource Locator for the constituent member of the particular group to enter the commodity selling system and a second network address is a second Uniform Resource Locator for the customer other than the constituent member of the particular group,
      wherein the constituent member is prompted to input certification information for the certifying by the certification unit based upon the predetermined address and the certification information;
   a displaying unit displaying the first commodity catalog offered by the shopping site; and
   an ordering unit ordering a commodity using the first commodity catalog.

17. A recording medium that records a program, executed by a computer, for selling a commodity, said program causing the computer to perform:
   providing, by a commodity selling system, a first network address for a constituent member of a particular group and a second network address for a customer who is not a member of the particular group, said first network address being a first Uniform Resource Locator for the constituent member of the particular group to enter the commodity selling system and said second network address being a second Uniform Resource Locator for the customer who is not a member of the particular group to enter the commodity selling system;
   judging whether a customer who has accessed via the network is a constituent member of a particular group based on a network address of a shopping site accessed by the customer;
   judging whether certification is to be performed based on the network address of the shopping site accessed by the customer;
   certifying the customer by referring to a database storing constituent member information of the particular group, when the customer is judged to be a constituent member of the particular group;
   selling an ordered commodity based on first sales conditions if the customer is certified as a constituent member of the particular group, upon receiving an order for the commodity from the customer to the first network address; and
   selling an ordered commodity based on second sales conditions if the customer is not a constituent member of the particular group, upon receiving an order for the commodity from the customer to the second network address;
   wherein both a first price as the first sales conditions and a second price as the second sales conditions are provided for the constituent member of the particular group through a first page identified by the first Uniform Resource Locator, the first price being lower than the second price, and the second price as the second sales conditions is provided for the customer who is not a constituent member of the particular group through a second page identified by the second Uniform Resource Locator.

18. A recording medium that records a program, executed by a computer, for selling a commodity, said program causing the computer to perform:

providing a shopping site that can be accessed via a first network address for a constituent member of a particular group and via a second network address for a customer other than a member of the particular group, said first network address being a first Uniform Resource Locator for the constituent member of the particular group to enter the commodity selling system and said second network address being a second Uniform Resource Locator for the customer who is not a member of the particular group to enter the commodity selling system;

determining based on the network address of the shopping site accessed by the customer whether to certify a customer;

certifying the customer by referring to a database storing constituent member information of the particular group, judged to be a constituent member of the particular group; and selling an ordered commodity based on first sales conditions when accessed by a constituent member of a particular group using the first network address, and selling an ordered commodity based on second sales conditions when accessed by using a second network address by a customer other than a member of the particular group wherein whether the customer is a constituent member of the particular group is determined based on a network address of a shopping site accessed by the customer;

wherein both a first price as the first sales conditions and a second price as the second sales conditions are provided for the constituent member of the particular group through a first page identified by the first Uniform Resource Locator, the first price being lower than the second price, and the second price as the second sales conditions is provided for the customer who is not a constituent member of the particular group through a second page identified by the second Uniform Resource Locator.

19. A recording medium that records a program, executed by a computer, for selling a commodity, said program causing the computer to perform:

providing a shopping site that can be accessed via a first network address for a constituent member of a first particular group and via a second network address for a constituent member of a second particular group, said first network address being a first Uniform Resource Locator for the constituent member of the particular group to enter the commodity selling system and said second network address being a second Uniform Resource Locator for the constituent member of the second particular group to enter the commodity selling system;

determining whether a customer is a constituent member of the first or second particular group based on a network address of the shopping site accessed by the customer;

certifying the customer by referring to a database storing constituent member information of the particular group, when the customer is judged to be a constituent member of the particular group; and selling an ordered commodity based on first sales conditions if the customer is a constituent member of the first particular group upon receiving an order for the commodity from the customer to the first network address, and selling an ordered commodity based on second sales conditions if the customer is a constituent member of the second particular group upon receiving an order for the commodity from the customer to the second network address, wherein both a first price as the first sales conditions and a second price as the second sales conditions are provided for the constituent member of the particular group through a first page identified by the first Uniform Resource Locator, the first price being lower than the second price, and the second price as the second sales conditions is provided for the customer who is not a constituent member of the particular group through a second page identified by the second Uniform Resource Locator.

20. The apparatus according to claim 13, further comprising a terminal device used for purchasing a commodity from the shopping site, the terminal device comprising:

an accessing unit accessing the shopping site, which shopping site offers a first commodity catalog to a constituent member of a particular group using the first network address and a second commodity catalog to a customer other than a constituent member of the particular group using the second network address, wherein the constituent member is prompted to input certification information for the certifying by the certification unit based upon the predetermined address and the certification information;

a displaying unit displaying the first commodity catalog offered by the shopping site; and an ordering unit ordering a commodity using the first commodity catalog.

* * * * *

UNITED STATES PATENT AND TRADEMARK OFFICE
CERTIFICATE OF CORRECTION

PATENT NO. : 7,519,545 B2 Page 1 of 1
APPLICATION NO. : 09/812845
DATED : April 14, 2009
INVENTOR(S) : Masanobu Kanazawa It is certified that error appears in the above-identified patent and that said Letters Patent is hereby corrected as shown below:

Column 15, Line 19, change "condition based" to --condition is based--.

Column 15, Line 56, change "group, on" to --group on--.

Column 20, Line 9, change "group, and" to --group and--.

Signed and Sealed this

Seventh Day of July, 2009

JOHN DOLL
*Acting Director of the United States Patent and Trademark Office*